Nov. 29, 1932.    H. C. PARKER    1,889,489
PROCESS OF EXTRACTING GOLD FROM SOLUTIONS
Filed Jan. 5, 1932

INVENTOR
H. C. PARKER
BY Hazard and Miller
ATTORNEYS

Patented Nov. 29, 1932

1,889,489

UNITED STATES PATENT OFFICE

HERSCHEL C. PARKER, OF LOS ANGELES, CALIFORNIA

PROCESS OF EXTRACTING GOLD FROM SOLUTIONS

Application filed January 5, 1932. Serial No. 584,821.

My invention relates to a process of extracting gold from solutions.

Certain sections of the ocean adjacent to gold bearing coasts or to the mouths of rivers carrying gold in solution or suspension and also bays or inlets in these regions have been found to carry gold to the amount up to ten cents and even higher values per ton of water.

Another important and sometimes very rich source of gold bearing natural solutions are mine waters and the water circulating or held in granite or other gold bearing rocks acting as reservoirs. The above source is known to be the cause of secondary enrichment of mines and by some authorities is held to be the chief factor even in the primary enrichment of mineral veins. My investigations show that it is quite possible for such solutions to carry as high a value as fifty cents in gold per ton of water. (See: "Data of Geochemistry", F. W. Clarke, Bul. 695, U. S. G. S. p. 120; and "Science", Oct. 17, 1924, "Extraction of gold from sea water", Prof. Fritz Haber, University of Berlin.)

Since the above mentioned and other sources are practically unlimited, the importance of a practical process for recovering the gold from such solutions which will yield a profit in operation is self-evident. Attempts have been made from time to time to devise processes for recovering the gold from such solutions and while it has been demonstrated that the gold can actually be recovered, all such attempts have been failures from a practical point of view for the reason that the cost of recovering the gold exceeded the value of the gold recovered.

It is obvious that any process of extracting gold from solutions lacks utility unless it shows a profit in operation. The problem, therefore, has been to devise some process which will handle relatively enormous quantities of the gold bearing water with a minimum cost of operation, which process will extract efficiently a large or major portion of the gold contained in the water.

It is known in the art that certain materials, so called adsorbents, have the property when in contact with gold bearing water to extract the gold from the water and it has been proposed to cause the gold bearing water to pass through a filter composed of or containing such adsorbents but such attempts have been failures for the reason that the filtration is necessarily too slow and cannot handle the enormous quantities of water necessary to make the process commercial and profitable.

The present process consists in providing a system of substantially continuous operation whereby large quantities of gold bearing water are passed rapidly through an apparatus in which it is agitated in contact with a particular adsorbent that I have discovered to be far superior to the ordinary adsorbents used, namely ferrous sulphide, and after the adsorbent has been sufficiently enriched with gold extracted from the water it is removed from the apparatus and the gold is recovered in any of the well known or preferred methods.

My invention consists in the steps of the process hereinafter described and claimed.

In the accompanying drawing which forms a part of the specification, I have illustrated a preferred embodiment of an apparatus suitable for carrying out my process, and in which.

Figures 1, 2:
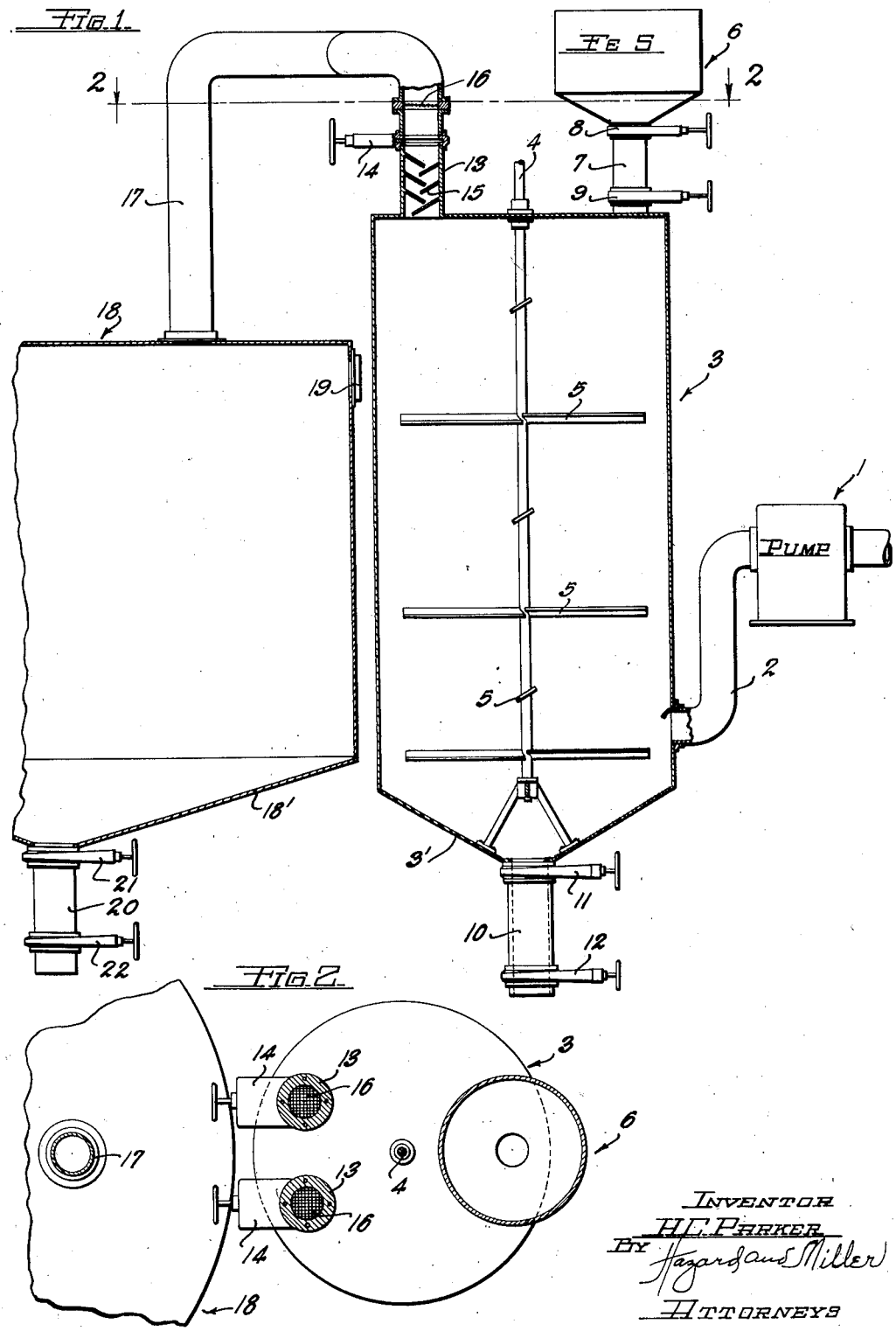
Fig. 1 is a vertical section of an apparatus for carrying out my process.
Fig. 2 is a horizontal section on lines 2—2.

Referring to the drawing 1 indicates a pump pumping gold bearing water such as sea water through pipe 2 into a tank 3, shown in this instance as a cylindrical vertical tank, in which a stirrer shaft 4 driven by any suitable power, not shown, is suitably journaled and is provided with stirrer arms 5. The adsorbent is supplied to the tank from a container 6 feeding the adsorbent through a chute 7 provided with shut off valves 8 and 9. The tank 3 has its bottom 3' hopper shaped and provides an outlet for the enriched adsorbent which preferably consists of a trap 10 with shut off valves 11 and 12. An outlet for the sea water is provided at the top of the tank 3 consisting of a conduit 13 provided with a shut off valve 14. The conduit 13 has mounted therein a series of downwardly inclined baffle plates 15 which serve to prevent the adsorbent from passing through the outlet 13. Any adsorbent that is carried by the baffle plates 15 is stopped by a 200 mesh screen 16 at the upper end of the outlet 13. The water then passes through a pipe 17 into a comparatively large settling tank 18 provided with an overflow 19. Small quantities of adsorbent which may have escaped through the screen 16 will settle to the bottom of the settling tank 18. The bottom of the tank 18 is hopper shaped as at 18' and provided with an outlet trap 20 controlled by valves 21 and 22.

*Operation:*—The gold bearing water, such as set water, is pumped into the tank 3 and the adsorbent, ferrous sulphide, is admitted to the tank from the container 6 by the operation of valves 8 and 9 as will be understood. Five pounds or more of the ferrous sulphide is used per ton of water in the continer 3. The ferrous sulphide should be granular in form and the granules of a size to pass between screens of 120 to 200 mesh. Th stirrer shaft 4 is vigorously agitated so as to cause an intimate contact of the particles of the adsorbent material with all parts of the water passing upwardly through the tank 3. The water will continuously pass through the outlet 13, the adsorbent being prevented from passing out therethrough by means of baffle plates 15 and particles that may have passed the baffle plates are retained by the mesh screen 16. Any smaller particles that may have become disintegrated and passing through screen 16 will settle in the settling tank 18 whence the sediment may be removed periodically through the outlet 20. In order that the screen 16 may be cleaned periodically without interruption of the operation of the system, I prefer to provide outlets 13 with baffle plates, valve and screen, in duplicate as shown in Figure 2. The gold enriched ferrous sulphide is periodically removed through the outlet 10. It is merely necessary to stop the operation of the pump and the stirrer shaft for a short time to give the ferrous sulphide an opportunity to settle. Except for this slight interruption, it will be noted that the process is a continuous one.

The ferrous sulphide retains its adsorbent properties for a considerable length of time until it is enriched up to say fifty percent—50% of its weight. My experiments have shown that it is feasible to extract as much as ninety percent of the gold contained in the water but it will be understood that the success of this process does not depend upon the complete or nearly complete extraction of gold from the water but on maintaining what may be called the highest point of economic operation. It may be more profitable to pass say three times as much water through the apparatus in a given time although in the first instance where only one volume of water is treated the extraction may be as high as eighty percent and in the other where three times the volume of water is treated it may be as low as fifty or forty and the gold recovered will be in the ratio of 8 to 12 or 15 for a unit of time.

It will be appreciated that the process to be profitable must be carried on on a large scale requiring a great outlay of capital and that relatively enormous quantities of water must be treated and the success of the process will depend on operating the system at the point of maximum efficiency having regard to the amount of gold recovered and the cost of operation inclusive of capital investment, maintenance, taxes and the like.

Various changes may be made by those skilled in the art in the steps of the process without departing from the spirit of my invention as claimed.

I claim:

1. A process of extracting gold from solutions comprising passing a gold bearing solution through a container in the presence of granular ferrous sulphide, agitating the solution for a time sufficient for the ferrous sulphide to extract an appreciable percentage of gold from the solution, and separating the gold enriched ferrous sulphide from the solution.

2. A process of extracting gold from solutions comprising passing a gold bearing solution through a container in the presence of granular ferrous sulphide of a size of 120 to 200 mesh, and agitating the solution for a time sufficient for the ferrous sulphide to extract an appreciable percentage of gold from the solution, and separating the gold enriched ferrous sulphide from the solution.

3. A process of extracting gold from solutions comprising passing a gold bearing solution through a container in the presence of granular ferrous sulphide of a size to pass through a 120 to 200 mesh, using a quantity of five pounds or more of ferrous sulphide to a ton of the solution to be treated, agitating the solution for a time sufficient for the ferrous sulphide to extract an appreciable percentage of gold from the solution, and separating the gold enriched ferrous sulphide from the solution.

In testimony whereof I have signed my name to this specification.

HERSCHEL C. PARKER.